United States Patent
Uematsu et al.

(10) Patent No.: US 9,050,618 B2
(45) Date of Patent: Jun. 9, 2015

(54) DOUBLE-SIDED COATING APPARATUS AND DOUBLE-SIDED COATING METHOD

(75) Inventors: Ikuo Uematsu, Yokohama (JP);
Masaomi Nakahata, Kamakura (JP);
Hideaki Morishima, Kashiwazaki (JP);
Kenta Fukatsu, Fujisawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 679 days.

(21) Appl. No.: 13/234,635

(22) Filed: Sep. 16, 2011

(65) Prior Publication Data
US 2012/0076933 A1    Mar. 29, 2012

(30) Foreign Application Priority Data

Sep. 24, 2010   (JP) .................. 2010-214503

(51) Int. Cl.
*B05B 7/06* (2006.01)
*B05D 5/00* (2006.01)
*B05C 1/08* (2006.01)
*B05C 5/02* (2006.01)
*B05C 9/04* (2006.01)
*B05D 3/12* (2006.01)
*B05C 11/02* (2006.01)
*B05D 1/26* (2006.01)
(Continued)

(52) U.S. Cl.
CPC ............. *B05C 1/0843* (2013.01); *B05C 5/0254* (2013.01); *B05C 9/04* (2013.01); *B05D 3/12* (2013.01); *B05C 11/025* (2013.01); *B05D 1/265* (2013.01); *B05D 3/0254* (2013.01); *B05D 2252/10* (2013.01); *H01M 4/0402* (2013.01)

(58) Field of Classification Search
None
See application file for complete search history.

(56) References Cited

U.S. PATENT DOCUMENTS 2,736,106 A  *  2/1956  Offen .............................. 34/642
2,904,813 A  *  9/1959  Schleicher ................. 15/230.11
(Continued)

FOREIGN PATENT DOCUMENTS

JP    51-38737         10/1976
JP    5-70007 A         3/1993
(Continued)

OTHER PUBLICATIONS

Combined Chinese Office Action and Search Report issued Nov. 5, 2013 in Patent Application No. 201110266104.3 with English Translation.

(Continued)

*Primary Examiner* — Charles Capozzi
(74) *Attorney, Agent, or Firm* — Oblon, McClelland, Maier & Neustadt, L.L.P.

(57) ABSTRACT

According to one embodiment, a double-sided coating apparatus includes a first coating head arranged on one side of a raw material to coat the one side with a coating liquid by alternately forming a coating region and a non-coating region in a direction crossing a delivery direction, a second coating head arranged on the other side of the raw material to coat the other side with the coating liquid by alternately forming the coating region and the non-coating region in the direction crossing the delivery direction, and a coating roller arranged near a position on the one side of the raw material and opposite to the second coating head across the raw material and having a large-diameter portion and a small-diameter portion with different diameters along an axial direction with the small-diameter portion opposite to the coating region and the large-diameter portion opposite to the non-coating region.

3 Claims, 5 Drawing Sheets

(51) Int. Cl.
  *B05D 3/02* (2006.01)
  *H01M 4/04* (2006.01)

(56) References Cited

U.S. PATENT DOCUMENTS

| | | | | |
|---|---|---|---|---|
| 4,064,288 | A | * | 12/1977 | Shah et al. ................ 427/58 |
| 4,425,869 | A | * | 1/1984 | Hull ........................ 118/314 |
| 5,192,394 | A | * | 3/1993 | Bard et al. ................ 216/91 |
| 5,674,556 | A | * | 10/1997 | Fukumura et al. ....... 427/113 |
| 6,168,663 | B1 | * | 1/2001 | McDonald ............... 118/314 |

FOREIGN PATENT DOCUMENTS

| | | |
|---|---|---|
| JP | 7-185436 | 7/1995 |
| JP | 7-185437 A | 7/1995 |
| JP | 2001-170541 | 6/2001 |
| JP | 2008-66049 A | 3/2008 |
| JP | 2011-147864 A | 8/2011 |

OTHER PUBLICATIONS

Office Action issued Sep. 3, 2013 in Japanese Patent Application No. 2011-208135 (with English-language translation).

* cited by examiner

DOUBLE-SIDED COATING APPARATUS AND DOUBLE-SIDED COATING METHOD

CROSS-REFERENCE TO RELATED APPLICATIONS

This application is based upon and claims the benefit of priority from prior Japanese Patent Application No. 2010-214503, filed Sep. 24, 2010, the entire contents of which are incorporated herein by reference.

FIELD

Embodiments described herein relate generally to a double-sided coating apparatus and a double-sided coating method used, for example, in a process in which both sides of metal foil are coated with an electrolyte at the same time and the like.

BACKGROUND

In the manufacture of, for example, a lithium secondary battery, sequential coating in which one side of a raw material such as aluminum foil is coated with a coating liquid such as an electrolyte or the like at a time is performed. In the sequential coating, the side to be coated and the other side are held by a backup roller when a raw material is delivered and only one side is coated and dried and then, the other side is coated.

On the other hand, a double-sided coating apparatus that attempts to improve throughput by coating both sides at the same time is known. For example, a raw material is delivered in the horizontal direction to coat both sides of the raw material with a coating liquid. The raw material is directly carried into a drying oven without using a roller because if the roller comes into contact with a location coated with the coating liquid, the coating liquid adheres to the roller. In the drying oven, the raw material is floated by hot air blown strongly both from above and below to prevent the raw material from coming into contact with the oven. Such a drying oven is called a floating drying oven.

Such a double-sided coating apparatus has problems as follows: In an apparatus transporting a raw material in the horizontal direction, the raw material is not supported by a roller and thus, the position precision of the raw material is low, resulting in lower coating precision. Moreover, drying of the surface of the coating liquid is fast and cracks appear, leading to lower coating quality. Further, thermal conduction from the rear side of the coated surface is weak and the distribution of binder varies on the surface of the raw material or in the coating liquid, causing a problem of lower adhesion.

Also, an apparatus that coats both sides with a coating liquid at the same time by causing aluminum foil to proceed vertically upward and providing coating heads on both sides of the aluminum foil is proposed.

In such a double-sided coating apparatus, coating heads H capable of performing well-balanced coating on both sides at the same time are needed to hold the raw material vertically, leading to a possibility of higher equipment costs.

Further, the floating drying oven has a problem that a vibration is generated in the raw material by a hot air and the vibration is transmitted to a portion to be coated, thereby decreasing uniformity in thickness of a coating liquid. Further, tension cannot be individually set for a portion to be coated and a portion to be dried and therefore, it is difficult to make conditions for coating and drying effective.

An object of the present embodiment is to provide a double-sided coating apparatus capable of performing excellent double-sided simultaneous coating while using coating heads used for single-sided coating and a double-sided coating method.

DETAILED DESCRIPTION

In general, according to one embodiment, a double-sided coating apparatus coats coating regions on both sides of a raw material having the coating regions and non-coating regions and formed in a sheet shape with a coating liquid, including a transport mechanism that transports the raw material in a delivery direction; a first coating head arranged on one side of the raw material to coat the one side with the coating liquid by alternately forming the coating region and the non-coating region in a direction crossing the delivery direction; a second coating head arranged on the other side of the raw material to coat the other side with the coating liquid by alternately forming the coating region and the non-coating region in the direction crossing the delivery direction; and a coating roller arranged near a position on the one side of the raw material and opposite to the second coating head across the raw material and having a large-diameter portion and a small-diameter portion with different diameters along an axial direction with the small-diameter portion opposite to the coating region and the large-diameter portion opposite to the non-coating region.

A double-sided coating apparatus according to an embodiment that coats a coating region on both sides of a raw material having the coating region and a non-coating region and formed in a sheet shape with a coating liquid, including a pair of transport rollers that nips the raw material and delivers the raw material in a predetermined delivery direction; a first coating head arranged downstream of the pair of transport rollers in the delivery direction of the raw material and arranged on one side of the raw material to coat the raw material with the coating liquid by alternately forming a first coating region and a first non-coating region in a direction perpendicular to the delivery direction; a second coating head arranged downstream of the pair of transport rollers in the delivery direction of the raw material and arranged on the other side of the raw material to coat the raw material with the coating liquid by alternately forming a second coating region and a second non-coating region in the direction perpendicular to the delivery direction; a drying apparatus downstream of the first coating head and the second coating head in the delivery direction of the raw material; a first coating roller provided between the first coating head and the second coating head, and the drying apparatus and having a large-diameter portion and a small-diameter portion with different diameters along an axial direction with the small-diameter portion opposite to the first coating region and the large-diameter portion opposite to the first non-coating region; and a second coating roller arranged opposite to the first coating roller and having the large-diameter portion and the small-diameter portion with different diameters along the axial direction with the small-diameter portion opposite to the second coating region and the large-diameter portion opposite to the second non-coating region to nip the raw material together with the first coating roller and also to deliver the raw material to the drying apparatus.

A double-sided coating method according to an embodiment of coating a coating region on both sides of a raw material having the coating region and a non-coating region and formed in a sheet shape with a coating liquid, including transporting the raw material; coating the raw material with the coating liquid by alternately forming a coating region and a non-coating region in a direction perpendicular to the delivery direction by a first coating head arranged on one side of the raw material; coating the raw material with the coating liquid by alternately forming the coating region and the non-coating region in the direction perpendicular to the delivery direction by a second coating head arranged on the other side of the raw material; and transporting the raw material by pressing both sides of the raw material by a coating roller arranged on the one side of the raw material and near an opposite position across the raw material from the second coating head and having a large-diameter portion and a small-diameter portion with different diameters along an axial direction with the small-diameter portion opposite to the coating region and the large-diameter portion opposite to the non-coating region.

A double-sided coating method according to an embodiment of coating a coating region on both sides of a raw material having the coating region and a non-coating region and formed in a sheet shape with a coating liquid, including nipping the raw material and delivering the raw material in a predetermined delivery direction by a pair of transport rolls; coating the raw material with the coating liquid by alternately forming a first coating region and a first non-coating region in a direction perpendicular to the delivery direction by a first coating head arranged downstream of the pair of transport rollers in the delivery direction of the raw material and arranged on one side of the raw material; coating the raw material with the coating liquid by alternately forming a second coating region and a second non-coating region in the direction perpendicular to the delivery direction by a second coating head arranged downstream of the pair of transport rollers in the delivery direction of the raw material and arranged on the other side of the raw material; transporting the raw material by pressing both sides of the raw material by a first coating roller provided between the first coating head and the second coating head, and a drying apparatus and having a large-diameter portion and a small-diameter portion with different diameters along an axial direction with the small-diameter portion opposite to the first coating region and the large-diameter portion opposite to the first non-coating region and a second coating roller arranged opposite to the first coating roller and having the large-diameter portion and the small-diameter portion with different diameters along the axial direction with the small-diameter portion opposite to the second coating region and the large-diameter portion opposite to the second non-coating region to nip the raw material together with the first coating roller and also to deliver the raw material to the drying apparatus; and drying the raw material downstream of the first coating head and the second coating head in the delivery direction of the raw material.

Figure 1:
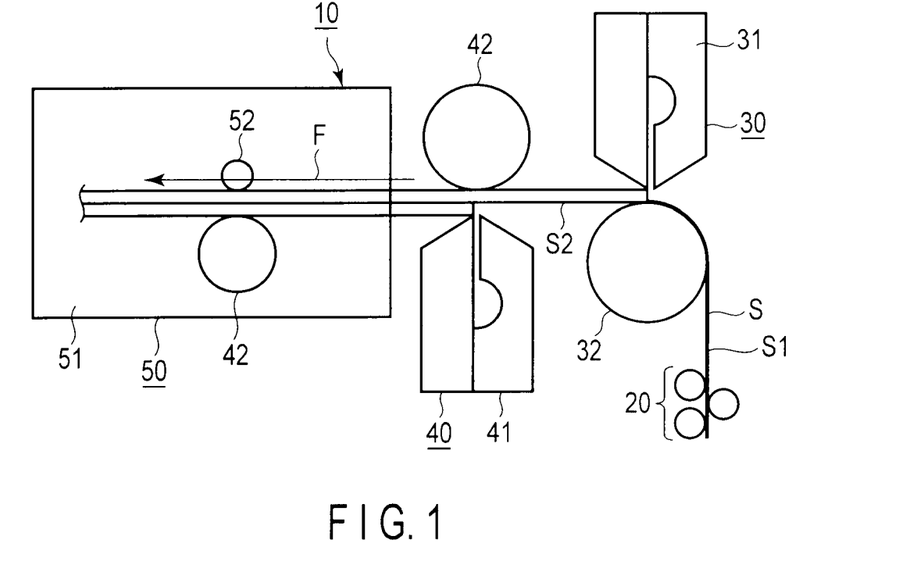
FIG. 1 is an explanatory view schematically showing a double-sided coating apparatus according to a first embodiment.
Figure 2:
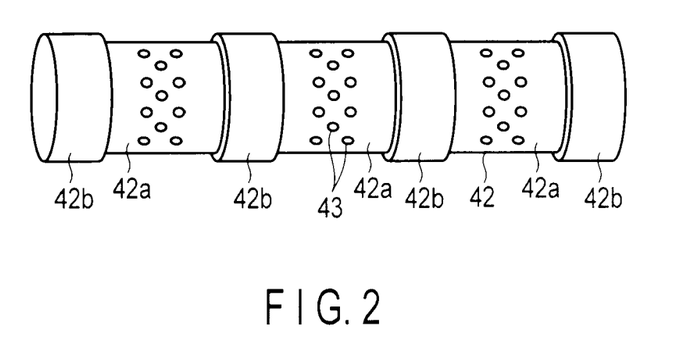
FIG. 2 is a perspective view showing a roller incorporated into the double-sided coating apparatus.
Figure 3:
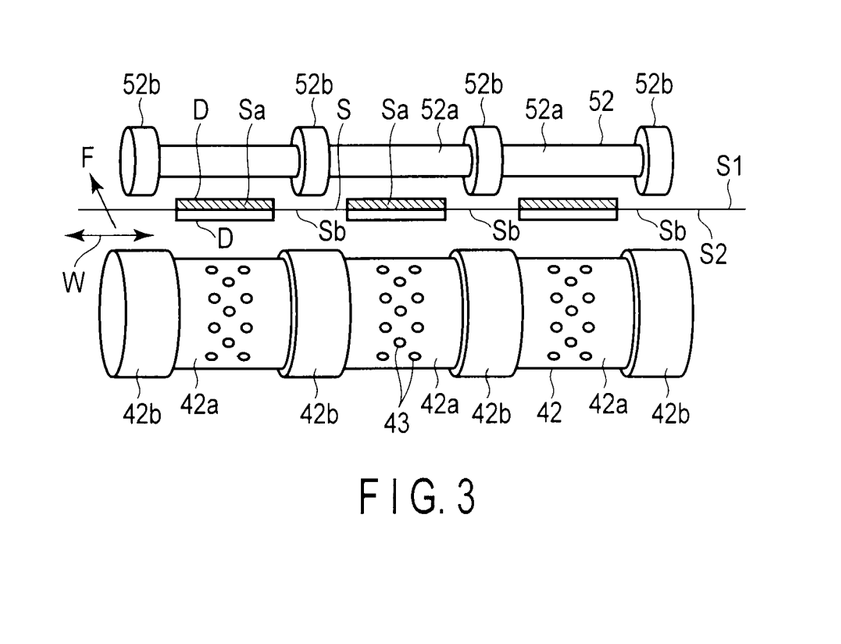
FIG. 3 is a schematic perspective view showing a state of the roller incorporated into the double-sided coating apparatus.

FIG. 1 is an explanatory view schematically showing a double-sided coating apparatus 10 according to an embodiment, FIG. 2 is a perspective view showing a coating roller 42 incorporated into the double-sided coating apparatus 10, and FIG. 3 is a perspective view schematically showing the coating roller 42 and a presser roller 52 incorporated into the double-sided coating apparatus 10. S in these figures denotes a raw material in a sheet shape such as aluminum foil and D denotes a coating liquid such as an electrolyte. The raw material S has a coating region Sa coated with the coating liquid D and a non-coating region Sb not coated with the coating liquid D provided therein and the coating region Sa and the non-coating region Sb are set alternately in a width direction W of the raw material S (direction perpendicular to a delivery direction F).

The double-sided coating apparatus 10 includes a delivery mechanism (transport mechanism) 20 that delivers the raw material S in the delivery direction F and a first coating unit 30, a second coating unit 40, and a drying apparatus 50 provided sequentially downstream of the delivery mechanism 20.

The first coating unit 30 includes a first coating head 31 provided on a front side S1 of the raw material S and a backup roller 32 provided on a rear side S2 across the raw material S from the first coating head 31. The backup roller 32 is formed in a cylindrical shape. The first coating head 31 and a second coating head 41 described later are each common coating heads used for single-sided coating.

The second coating unit 40 includes the second coating head 41 provided on the rear side S2 of the raw material S and a coating roller 42 provided on the front side S1 across the raw material S from the second coating head 41.

As shown in FIG. 2, the coating roller 42 has a small-diameter portion 42a and a large-diameter portion 42b having different diameters along an axial direction and is configured so that the small-diameter portion 42a is opposite to the coating region Sa and the large-diameter portion 42b is opposite to the non-coating region Sb. The small-diameter portion 42a has air delivery holes 43 formed therein to prevent a coating liquid with which the front side S1 is coated from coming into contact with the coating roller 42 during transportation by blowing air on the raw material S. With the configuration described above, the rear side S2 of the raw material S whose front side S1 is coated with a coating liquid by the first coating head 31 can be coated with the coating liquid by the second coating head 41. Incidentally, the air delivery holes 43 may be formed on the side face of the large-diameter portion 42b. Since the small-diameter portion 42a does not come into contact with the raw material S, the section thereof may not be circular.

The second coating unit 40 and the coating roller 42 are currently arranged, as shown in FIG. 1, symmetrically sandwiching the raw material S therebetween, but if the raw material S does not sag, the coating roller 42 may be provided in two positions around a symmetric position opposite to the second coating unit 40 across the raw material S.

The drying apparatus 50 includes a drying oven 51, the coating roller 42 provided in the drying oven 51 and provided, as shown in FIG. 3, on the rear side S2 of the raw material S, and the presser roller 52 provided on the front side S1 across the raw material S from the coating roller 42. Like the coating roller 42, the presser roller 52 has a small-diameter portion 52a and a large-diameter portion 52b having different diameters along the axial direction and is configured so that the small-diameter portion 52a is opposite to the coating region Sa and the large-diameter portion 52b is opposite to the non-coating region Sb. Incidentally, no air delivery hole is provided.

According to the double-sided coating apparatus 10 configured as described above, compared with sequential coating in which one side is coated at a time, one drying process is enough so that the drying time can be shortened, leading to improved throughput.

With the small-diameter portion 42a opposite to the coating region Sa, contact of the coating liquid D, the coating roller 42, and the presser roller 52 before drying can be prevented so that coating quality can be maintained. The raw material S is supported by the coating roller 42 and the presser roller 52 and air is delivered from the air delivery holes 43 and therefore, the raw material S is floated so that contact thereof with the drying oven 51 can be prevented. Therefore, there is no need to blow hot air strongly from below to prevent the raw material S from coming into contact with the drying oven 51, rapid drying can be avoided, and an occurrence of failure such as cracking can be prevented.

Further, the raw material S is supported by the coating roller 42 and the presser roller 52 and therefore, the raw material S little moves so that coating precision can be improved.

Both the first coating head 31 and the second coating head 41 are common coating heads used for single-sided coating and thus, low-cost coating heads can be used.

Therefore, according to the double-sided coating apparatus 10 in the present embodiment, excellent double-sided simultaneous coating can be performed while using coating heads used for single-sided coating.

Figure 4:
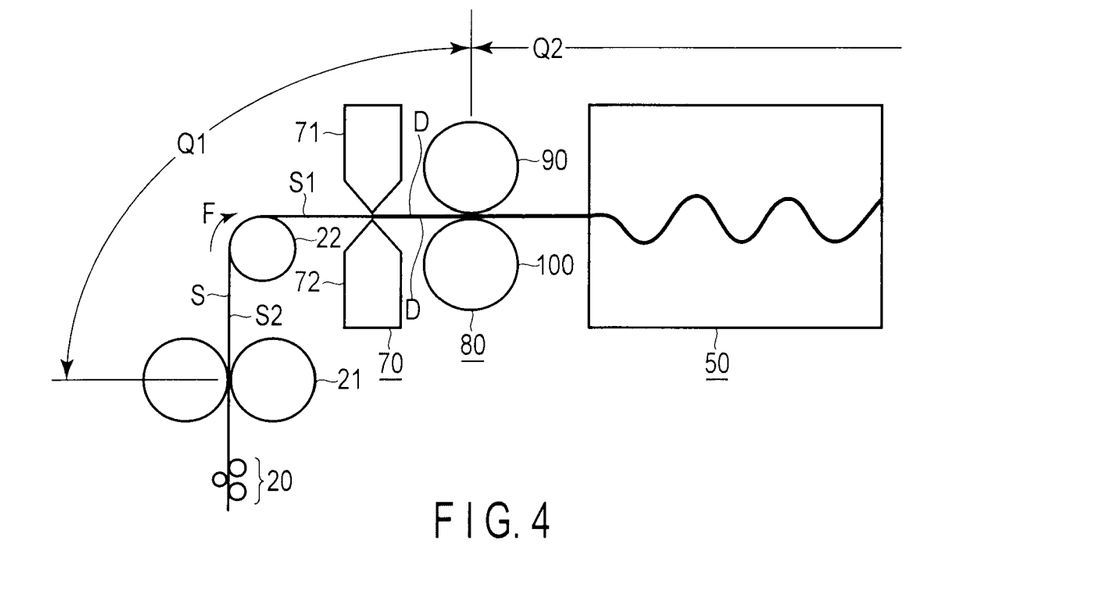
FIG. 4 is an explanatory view schematically showing a double-sided coating apparatus according to a second embodiment.
Figure 5:
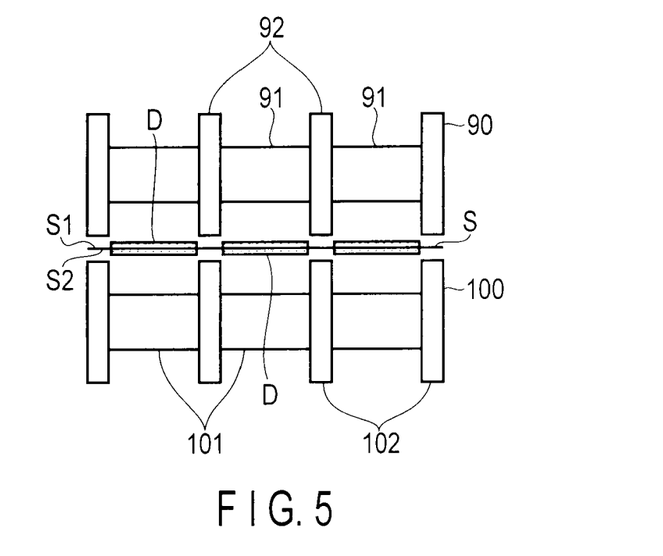
FIG. 5 is an explanatory view schematically showing a physical relationship of a first coating roller and a second coating roller incorporated into the double-sided coating apparatus and a raw material.
Figure 6:
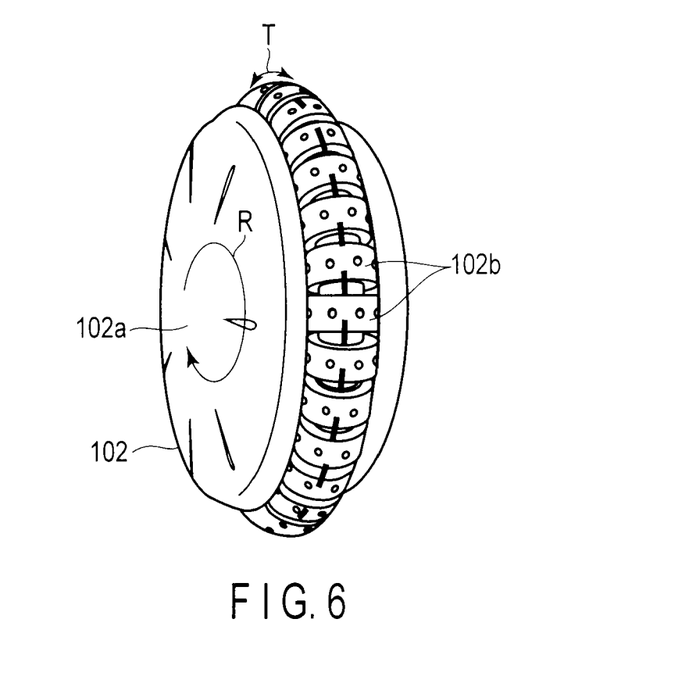
FIG. 6 is a perspective view showing a large-diameter portion incorporated into the second coating roll.
Figure 7:
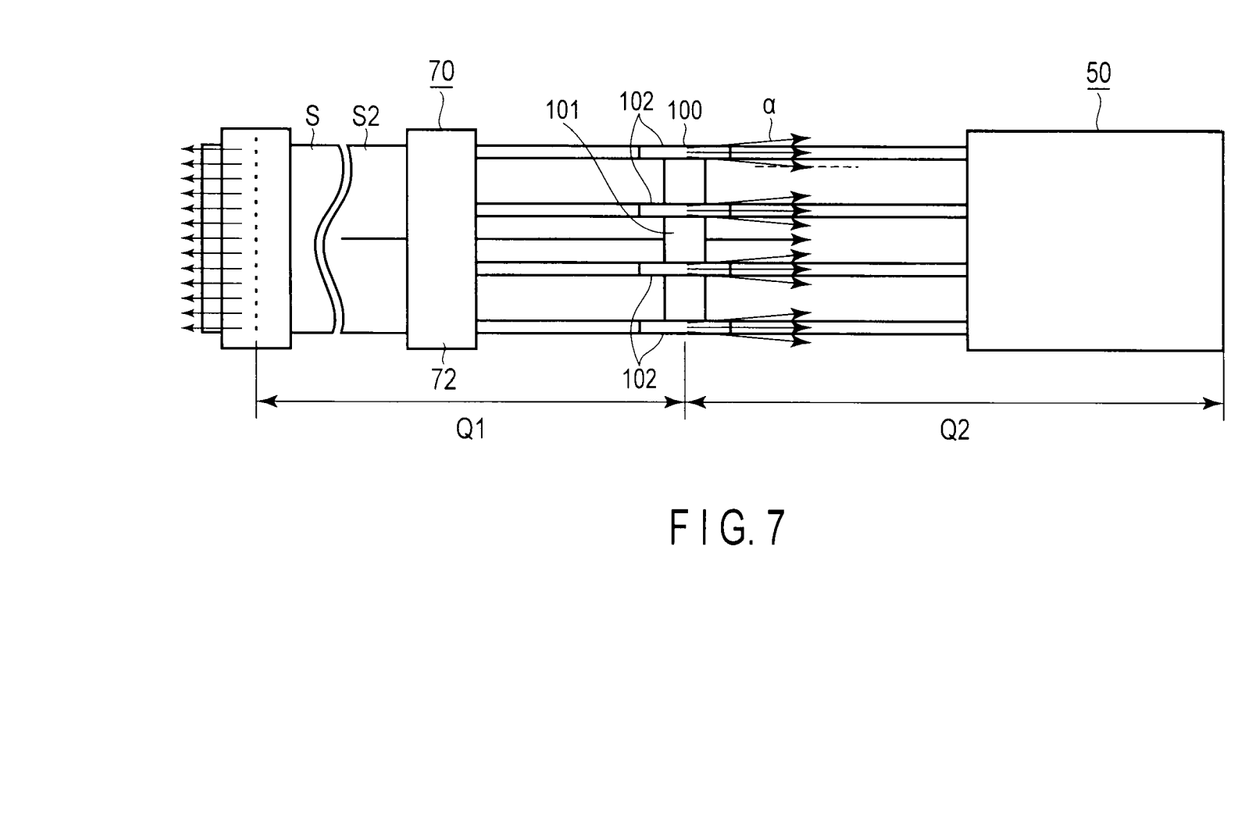
FIG. 7 is an explanatory view schematically showing the function of a nip mechanism incorporated into the double-sided coating apparatus.

FIG. 4 is an explanatory view schematically showing a double-sided coating apparatus 60 according to the second embodiment, FIG. 5 is an explanatory view schematically showing a physical relationship between a first coating roller 90 and a second coating roller 100 incorporated into the double-sided coating apparatus 60, FIG. 6 is a perspective view showing a large-diameter portion 103 incorporated into the second coating roller 100, and FIG. 7 is an explanatory view schematically showing the function of a nip mechanism 80. In these figures, the same reference numerals are attached to the same functional portions as those in FIGS. 1 to 3 and a detailed description thereof is omitted.

The double-sided coating apparatus 60 includes the delivery mechanism (transport mechanism) 20 that delivers the raw material S in the predetermined delivery direction F and a nip roller 21, a tension sensor 22, a coating portion 70, a nip mechanism 80, and the drying apparatus 50 provided sequentially downstream of the delivery mechanism 20.

The nip roller 21 includes a pair of transport rollers 21a, 21b in a cylindrical shape that nips the raw material S strongly and delivers the raw material S in the predetermined delivery direction F. The tension sensor 22 is installed in a roller baring portion and provided on the rear side S2 of the raw material S. The tension sensor 22 detects the tension of the raw material S by detecting a pressing force from the raw material S.

The coating portion 70 includes a first coating head 71 provided on the front side S1 of the raw material S and a second coating head 72 provided on the rear side S2 across the raw material S from the first coating head 71.

The nip mechanism 80 includes the first coating roller 90 provided on the front side S1 of the raw material S and the second coating roller 100 provided on the rear side S2 across the raw material S from the first coating roller 90. The nip mechanism 80 has a function to nip the raw material S strongly and also to deliver the raw material S in the predetermined delivery direction F.

The first coating roller 90 is formed of a metallic material and has, as shown in FIG. 5, a small-diameter portion 91 and a large-diameter portion 92 having different diameters along an axial direction and is configured so that the small-diameter portion 91 is opposite to the coating region Sa and the large-diameter portion 92 is opposite to the non-coating region Sb.

The second coating roller 100 has, as shown in FIG. 5, a small-diameter portion 101 and a large-diameter portion 102 having different diameters along the axial direction and is configured so that the small-diameter portion 101 is opposite to the coating region Sa and the large-diameter portion 102 is opposite to the non-coating region Sb. The large-diameter portion 102 is constituted of a so-called omni-drive. That is, the large-diameter portion 102 is formed by arranging a large-diameter wheel 102a rotating integrally with the small-diameter portion 101 in an arrow R direction in FIG. 6 and arranging a plurality of small-diameter wheels 102b arranged on an outer circumference of the large-diameter wheel 102a and rotating in an arrow T direction in FIG. 6 in a line by using a common circumference as a rotation axis. The large-diameter wheel 102a and the small-diameter wheel 102b make independent rotational motions and are driven for force control. The small-diameter wheel 102b is formed of a rubber material and thus nip the raw material S without gap between the small-diameter portion 101 and small-diameter wheel 102b.

The double-sided coating apparatus 60 configured as described above performs double-sided coating as follows. That is, the raw material S is delivered in the delivery direction F by the delivery mechanism 20. The raw material S is nipped strongly by the nip roller 21 and is further delivered. The tension is detected by the tension sensor 22 and feedback thereof is given to a drive mechanism of the nip roller 21 and the like.

Next, in the coating portion 70, the coating region Sa on the front side S1 of the raw material S is coated with a coating liquid D by the first coating head 71 and the coating region Sa on the rear side S2 of the raw material S is coated with the coating liquid D by the second coating head 72.

Next, the nip mechanism 80 nips the raw material S strongly by the first coating roller 90 and the second coating roller 100 and also delivers the raw material S in the predetermined delivery direction F. At this point, the small-diameter portions 91, 101 are opposite to the coating region Sa and the large-diameter portions 92, 102 are opposite to the non-coating region Sb and therefore, the coating liquid D before being dried will not adhere to the first coating roller 90 and the second coating roller 100.

By rotating the small-diameter wheels 102b, as shown in FIG. 7, a force in an arrow α direction can be applied to the raw material S in a contact position with the raw material S. Formation of wrinkles on the raw material S can be prevented by suitably setting the arrow α direction and the number of revolutions.

Further, the raw material S is strongly nipped by the nip roller 21 and the nip mechanism 80 and thus, the tension can be changed or the transmission of vibration can be blocked therearound. That is, an interval Q1 between the nip roller 21 and the nip mechanism 80 may have a tension appropriate for coating of the coating liquid D by the coating portion 70 and an interval Q2 between the nip mechanism 80 and the drying apparatus 50 may have a tension appropriate for drying. Vibration is provided to the raw material S in the drying apparatus 50 and thus, an adverse effect to coating by the coating portion 70 can be prevented from being produced by blocking the transmission of vibration by the nip mechanism 80.

Therefore, according to the double-sided coating apparatus 60 in the present embodiment, excellent double-sided simultaneous coating can be performed while using coating heads used for single-sided coating.

Figure 8:
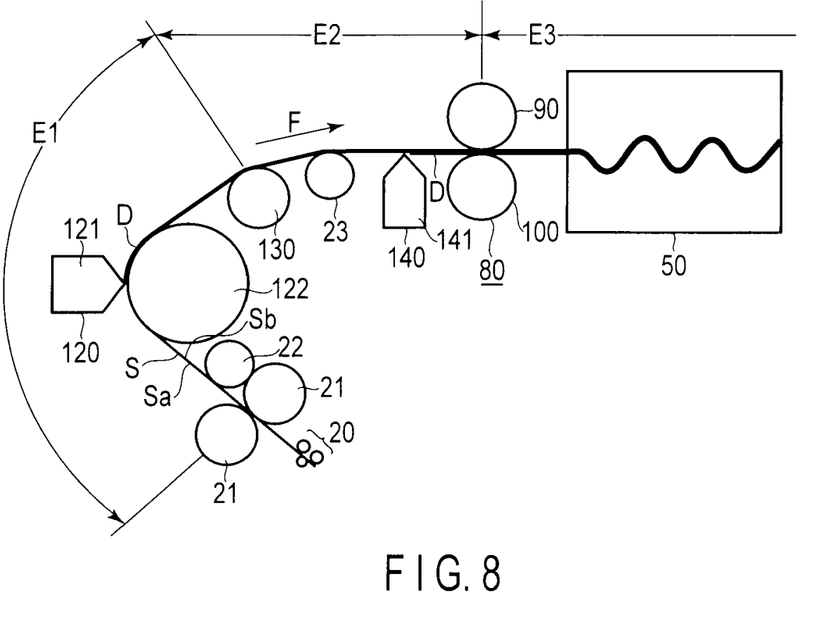
FIG. 8 is an explanatory view schematically showing a double-sided coating apparatus according to a third embodiment.

FIG. 8 is an explanatory view schematically showing a double-sided coating apparatus 110 according to the third embodiment. In FIG. 8, the same reference numerals are attached to the same functional portions as those in FIGS. 4 to 7 and a detailed description thereof is omitted.

The double-sided coating apparatus 110 includes the delivery mechanism (transport mechanism) 20 that delivers the raw material S in the predetermined delivery direction F and the nip roller 21, the tension sensor 22, a first coating portion 120, a suction roller 130, a tension sensor 23, a second coating portion 140, the nip mechanism 80, and the drying apparatus 50 provided sequentially downstream of the delivery mechanism 20.

The first coating unit 120 includes a first coating head 121 provided on the front side S1 of the raw material S and a backup roller 122 provided on the rear side S2 across the raw material S from the first coating head 121. The backup roller 122 is formed in a cylindrical shape. The first coating head 121 and a second coating head 141 described later are each common coating heads used for single-sided coating.

The suction roller (adjustment roll) 130 is formed in a cylindrical shape and has a plurality of vacuum holes formed therein and has a function to adjust the tension of the raw material S by sucking the raw material S through a reduced pressure inside the vacuum holes.

The tension sensor 23 is configured in the same manner as the tension sensor 22.

The second coating unit 140 includes the second coating head 141 provided on the rear side S2 of the raw material S. No backup roller is provided. As shown in FIG. 8, the first coating head 121 and the second coating head 141 are arranged by being spaced along the delivery direction of the raw material S and the suction roller 130 is arranged therebetween.

The double-sided coating apparatus 110 configured as described above performs double-sided coating as follows. That is, the raw material S is delivered in the delivery direction F by the delivery mechanism 20. The raw material S is nipped strongly by the nip roller 21 and is further delivered. The tension is detected by the tension sensor 22 and feedback thereof is given to a drive mechanism of the nip roller 21 and the like.

Next, in the coating portion 120, the coating region Sa on the front side S1 of the raw material S is coated with the coating liquid D by the first coating head 121.

Next, the raw material S is sucked by the suction roller 130 and also the tension thereof is adjusted. Then, the tension is detected by the tension sensor 23 and feedback thereof is given to the drive mechanism of the nip roller 21 and the like.

Next, in the second coating portion 140, the coating region Sb on the rear side S2 of the raw material S is coated with the coating liquid D by the second coating head 141.

Next, the nip mechanism 80 nips the raw material S strongly by the first coating roller 90 and the second coating roller 100 and also delivers the raw material S in the predetermined delivery direction F. At this point, the small-diameter portions 91, 101 are opposite to the coating region Sa and the large-diameter portions 92, 102 are opposite to the non-coating region Sb and therefore, the coating liquid D before being dried will not adhere to the first coating roller 90 and the second coating roller 100. Formation of wrinkles on the raw material S can be prevented by rotating the small-diameter wheels 102b.

Further, the raw material S is strongly nipped by the nip roller 21, the suction roller 130, and the nip mechanism 80 and thus, the tension can be changed or the transmission of vibration can be blocked therearound. That is, an interval E1 between the nip roller 21 and the suction roller 130 may have a tension appropriate for coating the front side Sa with the coating liquid D by the first coating portion 120, an interval E2 between the suction roller 130 and the nip mechanism 80 may have a tension appropriate for coating the rear side Sb with the coating liquid D by the second coating portion 140, and an interval E3 between the nip mechanism 80 and the drying apparatus 50 may have a tension appropriate for drying. Vibration is provided to the raw material S in the drying apparatus 50 and thus, an adverse effect to coating by the second coating portion 140 can be prevented from being produced by blocking the transmission of vibration by the nip mechanism 80.

Therefore, according to the double-sided coating apparatus 110 in the present embodiment, excellent double-sided simultaneous coating can be performed while using coating heads used for single-sided coating.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A double-sided coating apparatus that coats a coating region on both sides of a raw material having the coating region and a non-coating region and formed in a sheet shape with a coating liquid, comprising:
    a pair of transport rollers that nips the raw material and delivers the raw material in a predetermined delivery direction;
    a first coating head arranged downstream of the pair of transport rollers in the delivery direction of the raw material and arranged on one side of the raw material to coat the raw material with the coating liquid by alternately forming a first coating region and a first non-coating region in a first direction perpendicular to the delivery direction;
    a second coating head arranged downstream of the pair of transport rollers in the delivery direction of the raw material and arranged on the other side of the raw material to coat the raw material with the coating liquid by alternately forming a second coating region and a second non-coating region in the first direction perpendicular to the delivery direction;
    a dryer arranged downstream of the first coating head and the second coating head in the delivery direction of the raw material and configured to dry the coating liquid;
    a first coating roller provided between the dryer and the first and second coating heads, and the dryer and having a first larger-diameter portion and a first smaller-diameter portion with different diameters along a first axial direction of the first coating roller with the first smaller-diameter portion opposite to the first coating region and the first larger-diameter portion opposite to the first non-coating region; and a second coating roller arranged opposite to the first coating roller and having a second larger-portion and a second smaller-diameter portion with different diameters along a second axial direction of the second coating roller with the second smaller-diameter portion opposite to the second coating region and the second larger-diameter portion opposite to the second non-coating region to nip the raw material together with the first coating roller and also to deliver the raw material to the drying apparatus;

wherein the second-larger portion of the second coating roller comprises plural smaller-diameter wheels arranged in a circumference of the second larger-diameter portion and rotatable about respective axes which are perpendicular to the second axis of the second larger-diameter portion so as to generate tension in a second direction crossing the delivery direction by rotating the smaller-diameter wheels.

2. The double-sided coating apparatus according to claim 1, wherein
the first coating roller is made of a metallic material and the smaller-diameter wheels of the second coating roller are formed of an elastic material.

3. The double-sided coating apparatus according to claim 1, wherein
the first coating head and the second coating head are arranged by being spaced along the delivery direction of the raw material, and
an adjustment roller to adjust a tension of the raw material is provided between the first coating head and the second coating head.

* * * * *